No. 661,969. Patented Nov. 20, 1900.
V. FUHR.
COMBINED CORN CRUSHER AND FODDER SHREDDER.
(Application filed May 17, 1900.)
(No Model.) 2 Sheets—Sheet 1.
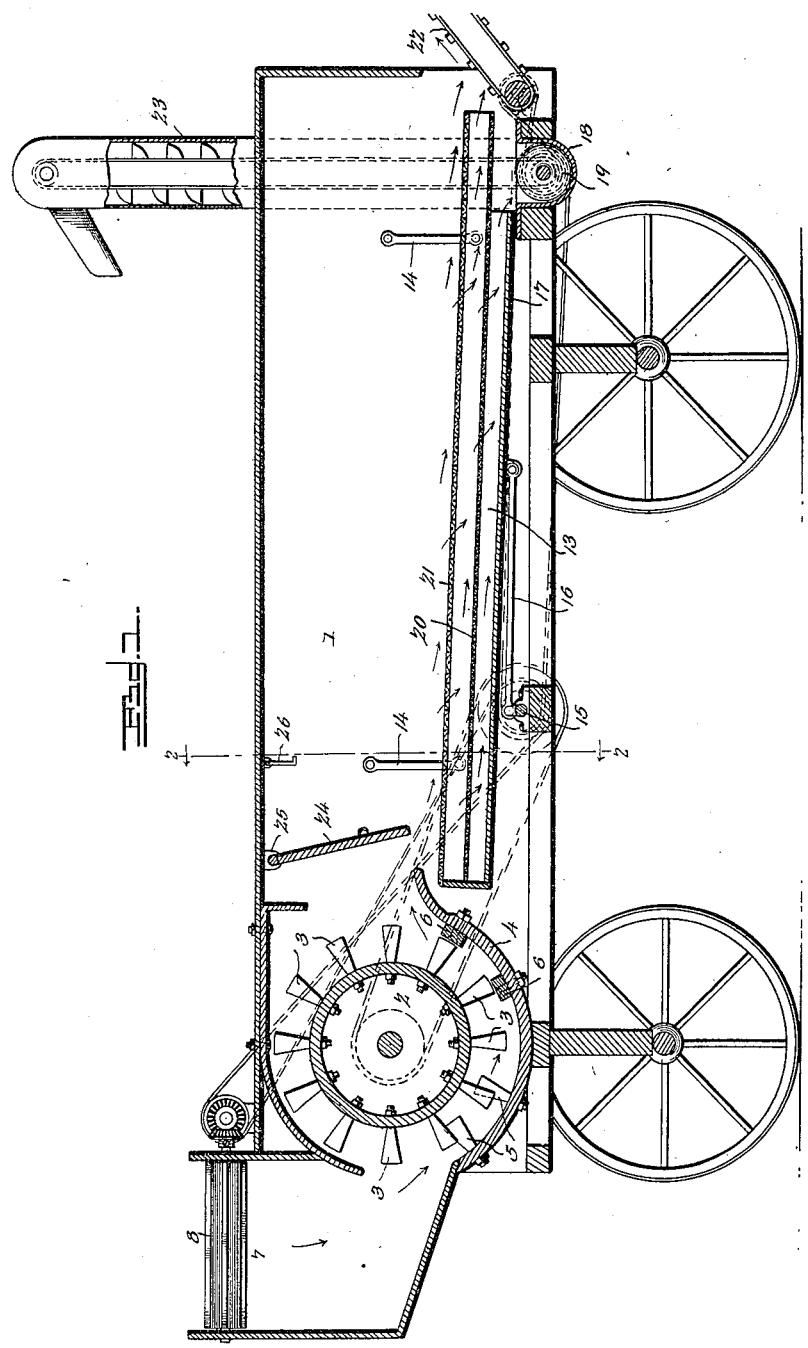
Witnesses
V. Fuhr Inventor
by C. A. Snow & Co.
Attorneys No. 661,969. Patented Nov. 20, 1900.
V. FUHR.
COMBINED CORN CRUSHER AND FODDER SHREDDER.
(Application filed May 17, 1900.)
(No Model.) 2 Sheets—Sheet 2.
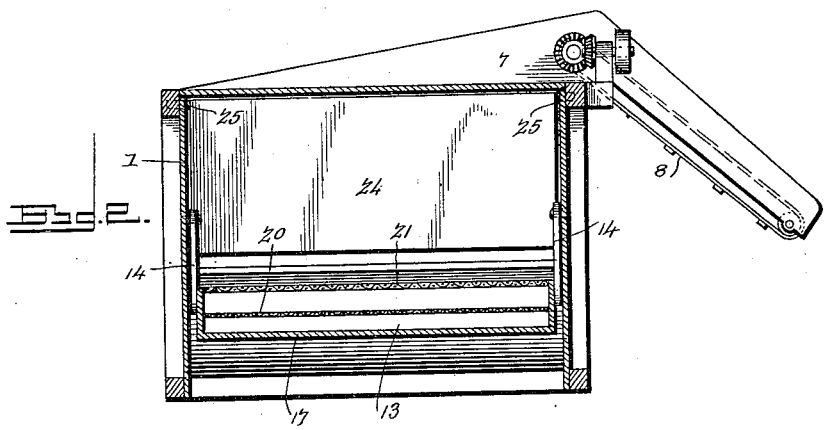
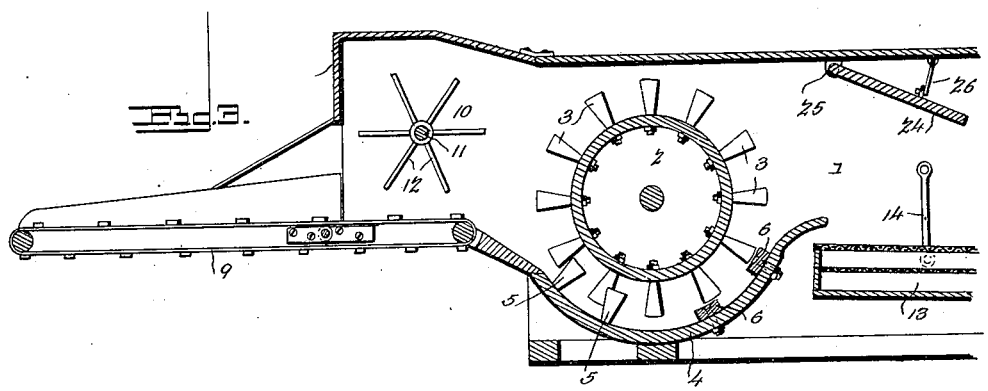
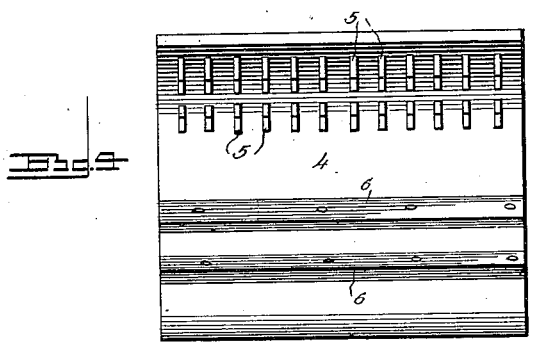

UNITED STATES PATENT OFFICE.

VALENTINE FUHR, OF HAMLET, ILLINOIS.

COMBINED CORN-CRUSHER AND FODDER-SHREDDER.

SPECIFICATION forming part of Letters Patent No. 661,969, dated November 20, 1900.

Application filed May 17, 1900. Serial No. 17,032. (No model.)

*To all whom it may concern:*

Be it known that I, VALENTINE FUHR, a citizen of the United States, residing at Hamlet, in the county of Mercer and State of Illinois, have invented a new and useful Combined Corn-Crusher and Fodder-Shredder, of which the following is a specification.

My invention is an improved combined corn-crusher and fodder-shredder, one object of my invention being to provide a machine which is efficient in shredding fodder and in simultaneously crushing the grains and cobs and reducing the same to a meal composed of crushed grains and cobs in correct proportion to secure the best results in feeding.

Another object of my invention is to provide a machine which is adapted to crush corn and reduce the same sufficiently for feeding purposes without heating the meal and crushed corn during the process of reduction, and hence producing a superior grade of feed-meal which may be stored in large quantities and does not become heated and soured when kept for a comparatively long period of time.

My invention consists in the peculiar construction and combination of devices hereinafter fully set forth, and pointed out in the claims.

In the accompanying drawings, Figure 1 is a vertical longitudinal sectional view of a combined corn-crusher and fodder-shredder embodying my improvements. Fig. 2 is a vertical transverse sectional view of the same. Fig. 3 is a vertical longitudinal sectional view illustrating a modification. Fig. 4 is a detail top plan view of the concave.

In the embodiment of my invention I preferably mount the inclosing case 1 on wheels, so that the same may be readily driven from one point to another and used in the field.

Disposed in one end of the casing 1, transversely in the same, is a revoluble cylinder 2, which is similar to a threshing-cylinder and is provided with radial projecting teeth 3. A concave 4 is disposed below the cylinder 2 and coacts therewith in the shredding of the fodder and the crushing of the corn and the reduction thereof to feed-meal composed of ground or crushed grains of corn and cobs. The said concave is provided on its front side with shredding-teeth 5, which coact with the teeth 3 of cylinder 2 in the shredding of the fodder and the breaking of the corn-ears into fragments, said cylinder and concave teeth being intercurrent as will be understood, and the said concave is provided near its rear side with transversely-disposed bars 6, of suitable width and thickness.

It will be observed by reference to the drawings that the space in the concave between the teeth 5 and the bars 6 is open, and the coaction of the cylinder and concave 4 thus provided is such that upon the cylinder being rotated and corn as cut and cured in the field fed between the cylinder and concave the fodder is effectually shredded by the coacting cylinder and concave teeth, the cobs or ears broken into fragments thereby without the necessity of first husking the corn, certain of the grains are crushed and reduced by the coacting cylinder and concave teeth, and owing to the attrition of the crushed particles, which tend to pack on the concave between the teeth and the bars thereof and between the bars of the concave, and the coaction of the end surfaces of the cylinder-teeth and the top surfaces of the concave-bars, which latter retard the passage rearward over the concave of the crushed particles, the corn is ground and reduced to a meal composed of crushed grains and cobs of sufficient fineness for feed purposes and which is exceedingly nutritious and palatable and possessese flesh-forming and fattening properties in the highest degree.

In the embodiment of my invention shown in Figs. 1 and 2 a feed-hopper 7 is employed, which is disposed transversely on the front or feed end of the casing and communicates with the shredding and crushing mechanism hereinbefore described. An inclined endless feed-carrier 8 leads to the said hopper and is adapted to convey the cured corn, fodder and all, to the hopper and discharge the same therein, the inclined lower side of the hopper causing the corn to be automatically fed to the shredding and crushing mechanism, as will be understood.

In Fig. 3 of the drawings I have illustrated a modified form of my invention, in which the feed-hopper is dispensed with and a horizontally-disposed endless feed-carrier 9 is employed, on which the corn is thrown, and which, being in operation, conveys the corn to the shredding and crushing mechanism. Disposed above the feed-carrier 9, at the inner end thereof, is a revoluble feeder 10, which comprises, essentially, a rotating shaft 11, provided with radial spurs 12. The said revoluble feeder, coacting with the endless feed-carrier, is efficient in feeding the corn automatically to the shredding and crushing mechanism, as will be understood.

I will now describe means for separating the crushed corn and cobs from the shredded fodder in screening the crushed corn and the finer particles of the cobs from the coarser particles of the cobs which are too large for feeding purposes as a component of the feed-meal.

A shaking-shoe 13 is disposed in the casing 1 in rear of the concave and is suspended by means of the usual hangers 14. A crank-shaft 15, which is disposed transversely under the shaking-shoe and is journaled in bearings in the sides of the casing, has its crank connected to the shaking-shoe by a pitman, as at 16. The said shaft being rotated, reciprocating motion is imparted to the shaking-shoe, as will be readily understood. The bottom 17 of the shaking-shoe is imperforate, and the same discharges into a trough 18, transversely disposed at the rear end of the casing and in which is located a conveying-worm 19. Disposed above the bottom 17 of the shaking-shoe is a screen 20, of suitable fineness, and above said screen is a coarser screen 21.

The material, composed of shredded fodder, crushed corn, and crushed and broken particles of corncobs, is discharged from the coacting cylinder and concave onto the upper coarser screen of the shaking-shoe. The said screen serves to separate the crushed corn and the finer particles of the cobs from the coarser particles of the cobs which are too large for use as a component of the meal and from the shredded fodder, the latter and the larger particles of the corncobs being discharged upon the elevator or carrier 23 and delivered thereby to a stack, bin, or wagon, as the case may be. The screen 20 effects a subsequent separation of the stock, such material as passes through the screen constituting the finished meal or product and such material as fails to pass therethrough being discharged therefrom onto the elevator or carrier 22, as before. In these processes of separation the crushed stock or meal which results as a finished product therefrom is composed of about two-thirds crushed and more or less finely-pulverized corn and one-third pulverized or finely-comminuted cobs. This is found to be the best proportion to secure maximum fattening and flesh-forming results from the meal, but by modifying the screens as may be required this proportion may be varied, if desired. The imperforate bottom of the shoe 13 delivers the meal into the trough 18, from which it is ejected by the worm. An elevator of the endless type, such as shown at 23 in Fig. 1, may be used to receive the meal from the discharge-trough 18 and convey the same to a wagon or other suitable receptacle.

A gate 24 is disposed in rear of the shredding and crushing mechanism and over the inner upper end of the shaking and sifting shoe. The said gate is hinged or pivoted at its upper side, as at 25, and is adapted to swing against the rear side of the concave and to open in response to the pressure of the material carried rearward by the cylinder 2, the said gate serving to feed the materal evenly over the shaking-shoe when the machine is in operation, as will be understood. When it is not necessary or desirable to use the gate in connection with the shredding and crushing apparatus and the vibrating shoe, the said gate may be swung open and secured, as by a hook 26, as shown in Fig. 3.

Power may be communicated to the machine from any suitable source, as an engine, by any suitable means. In Fig. 1 for the purposes of illustration I have indicated the cylinder-shaft, the crank-shaft, the worm, the feed-carrier, and the elevators 22 23 as being connected together by means of pulleys and an endless belt, as is usual in machines of this class.

In practice the cylinder-teeth are of the length of about two inches and the concave-teeth are about one inch in length.

Having thus described my invention, I claim—

1. The combination, in a combined corn-crusher and fodder-shredder, of a revoluble cylinder, and an imperforate concave armed solely with shredding and breaking teeth on its front portion, said teeth and said cylinder-teeth being intercurrent, and said concave being armed solely on its rear portion with transversely-disposed crushing-bars, the face of said imperforate concave intermediate of said teeth and bars being free of teeth or bars, substantially as described.

2. The combination, in a combined corn-crusher and fodder-shredder, of a revoluble cylinder, and an imperforate concave armed solely with shredding and breaking teeth on its front portion, said teeth and said cylinder-teeth being intercurrent and said concave being armed solely on its rear portion with transversely-disposed crushing-bars, substantially as described.

3. The combination, in a combined corn-crusher and fodder-shredder, of a revoluble cylinder, and an imperforate concave armed solely with shredding and breaking teeth on its front portion, said teeth and said cylinder-teeth being intercurrent and said concave being armed solely on its rear portion with transversely-disposed crushing-bars, and a sifter onto which said concave discharges, adapted to separate the meal from the imperfectly-reduced products, substantially as described.

4. The combination in a combined corn-crusher and fodder-shredder, of a revoluble toothed cylinder, and an imperforate concave armed solely on its front portion with shredding and breaking teeth, said cylinder and concave teeth being intercurrent, and armed solely on its rear portion with transversely-disposed bars, the end surfaces of the cylinder-teeth sweeping over and in close proximity to the top surfaces of the said bars and coacting therewith to grind material between them, substantially as described.

In testimony that I claim the foregoing as my own I have hereto affixed my signature in the presence of two witnesses.

VALENTINE FUHR.

Witnesses:
 N. A. TAYLOR,
 E. PEARL WAIT.